United States Patent

[11] 3,524,463

[72] Inventors Fred A. Rose
Madison, Wisconsin;
George L. Congdon, Fort Atkinson, Wisconsin
[21] Appl. No. 688,480
[22] Filed Dec. 6, 1967
[45] Patented Aug. 18, 1970
[73] Assignee Air Reduction Company, Incorporated
New York, New York
a Corp. of New York

[54] AUTOMATIC VAPORIZER CONTROLLER
11 Claims, 3 Drawing Figs.
[52] U.S. Cl. .................................................. 137/93,
128/188, 128/194, 250/43.5, 356/51
[51] Int. Cl. ..................................................... A61m 17/00,
A61m 15/00, G01n 21/00
[50] Field of Search ......................................... 137/93; 73/;
128/188, 194, Res-Elec. Dig.; 356/204, 205,
211, 51; 250/43.5, 233

[56] References Cited
UNITED STATES PATENTS
2,411,672  11/1946  Van Den Akker ............ 250/43.5X
2,617,940  11/1952  Giguere ....................... 250/43.5
2,828,741  4/1958   Delest ................... 128/(Res.-Elec.-Dig.)UX
2,874,298  2/1959   Kindred ....................... 250/43.5
2,915,056  12/1959  Lee .............................. 128/194
3,161,769  12/1964  McPherson .................... 250/43.5
3,166,676  1/1965   Robinson ..................... 250/43.5
3,189,533  6/1965   Anscherlik ................... 137/93X
3,281,595  10/1966  Rusz ............................ 250/43.5

Primary Examiner— William F. O'Dea
Assistant Examiner— David J. Zobkiw
Attorneys— Edmund W. Bopp and H. Hume Mathews ABSTRACT: An optical-electrical-mechanical apparatus comprising a revolving drum mounted on a drive shaft, said drum having two apertures at 180 degrees, one of said apertures being vacant and the other containing a fluorescent screen with a light conversion peak at a predetermined wave length. A sensor cell is fixed within the drum and has quartz windows at each end. An emitter lamp of the predetermined wave length is positioned adjacent one side of the drum, and a photocell is positioned diametrically opposite to the lamp on the other side of the drum with the sensor cell quartz windows along the diameter. A gas sample is continuously introduced to the cell as a parallel branch to the main gas circuit. A meter reading is obtained from the photocell through a comparison circuit derived from the alternation of drum apertures to a position adjacent the lamp. The meter reading not only indicates concentration but also leads to a meter relay which signals a vapor input circuit if the concentration reads below a variable predetermined level. Alarms are provided to notify an attendant or stop the functioning under certain specific conditions.

INVENTORS
FRED A. ROSE
GEORGE L. CONGDON

BY
AGENT

AUTOMATIC VAPORIZER CONTROLLER

BACKGROUND OF THE INVENTION

The invention relates to the area of automatic control of the concentration of anesthetic agent administered to a patient.

Anesthesia is administered through nonrebreathing, partial rebreathing, or rebreathing systems. The nonrebreathing system has permitted the most accurate knowledge of the concentration of anesthetic agent administered since the concentration of new agent administered is the concentration of agent inhaled. However, use of the system is very costly because large amounts of anesthetic agent are exhaled to the atmosphere.

Where partial rebreathing and rebreathing systems are used, accurate knowledge of agent concentration is not readily available because of the recirculation of exhaled anesthetic agent in addition to that newly administered. The rebreathing systems substantially eliminate waste but require the most extensive apparatus for concentration control.

The prior art has not provided efficient apparatus for concentration control in a rebreathing system.

SUMMARY OF THE INVENTION

It is an object of the present invention to provide the anesthetist with an automatic control check of his observations of the patient in anesthesia administration.

It is a further object of the present invention to provide a system for automatically analyzing and controlling the anesthetic agent concentration in a rebreathing anesthesia system.

It is also an object of the present invention to provide a unique alarm system to notify an attendant or stop the apparatus function if certain conditions are present.

It is another object of the present invention to provide a novel means for determining the presence of a desired constituent in a sample.

The foregoing and other objects are attained by use of apparatus reading a concentration of anesthetic agent in a gas sample to operate or shut off the input system so that predetermined levels are attained.

The foregoing and other objects, features, and advantages will become apparent in the light of the following description and claims taken with the accompanying drawings.

DESCRIPTION OF THE PREFERRED EMBODIMENT

Figure 1:
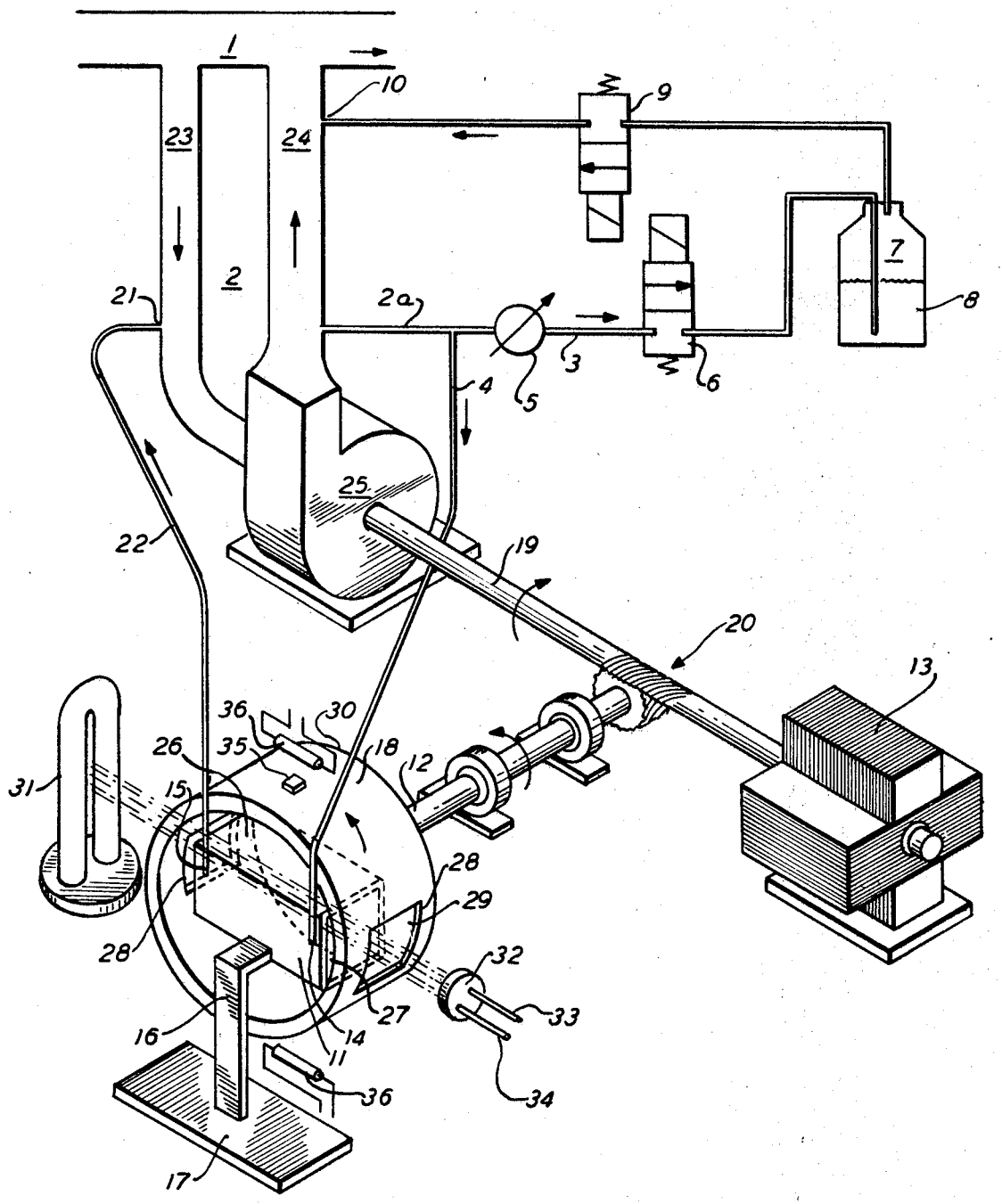
FIGURE 1 is a combined schematic illustration of the anesthesia flow through the fluid analysis and control circuit and perspective view of the drum assembly.

Referring now in more detail and with reference characters to the drawings, in FIGURE 1, inhalation gas stream 1 leading to the patient has a sample by-pass 2 which includes main lines 23 and 24 and branch line 2a which splits into a vaporizor flow line 3 and analysis flow line 4. Main line 24 is shown in FIGURE 1 returning to stream 1, but it could return elsewhere, as, e.g. the exhalation gas stream, not shown. Vaporizer flow line 3 includes a pump 5, a first solenoid operated valve 6, a vaporizer 7 including a liquid halothane reservoir 8 through which the vaporizer flow is bubbled for saturation with halothane vapor, and a second solenoid operated valve 9 before rejoining main line 24 at 10.

It should be noted that the pump and two solenoid operated valves operate simultaneously to permit flow in line 3 under a pressure differential.

The analysis flow 4 enters sensor cell 11 at 14. Sensor cell 11 is held fixedly in place by support bar 16 attached to support 17. Drum 18 is adapted to rotate at a constant speed of approximately 120 RPM on drive shaft 12 which is in drive relation to drive shaft 19 of synchronous motor 13 by a worm gear arrangement generally designated at 20. The flow exits cell 11 at 15 and rejoins main line 23 at 21 through line 22.

Circulation fan 25 moves the flow through the main by-pass lines 23, 24, and is driven by motor 13 through shaft 19 at approximately 3600RPM. The fan provides for circulation of a representative sample of the rebreathing gas constituents.

Sensor cell 11 is of hollow rectangle box shape with opaque side walls 26 and opposed light transparent windows 27 preferably made of quartz. Drum 18 comprises a hollow cylindrical member having diametrically opposed openings 28. Within one opening is placed a phosphor-quartz material 29 having a light conversion peak at a predetermined wave length band while the other is left vacant. Drum 18 further comprises a base plate 30 closing one end to which the drive shaft 12 is connected and an open end through which is received sensor cell 11.

In operation, an ultraviolet light source, lamp 31, emitting light at the conversion peak of material 29 is placed to one side of the drum and a photoresistor 32 having lead wires 33, 34 is placed adjacent the diametrically opposed side of the drum. As the drum rotates at a constant speed, each 180° of drum rotation presents a drum opening 28 adjacent the source 31 alternately vacant as in FIGURE 1 and then with the material 29. With cell windows 27 in fixed position, the drum acts as a chopper to the light source at each 180° when the source 31, openings 28, windows 27, and photoresistor 32 are aligned. Since the single cell 11 is used, there is a pulse type output through the photoresistor. The pulse type output is a result of a reference pulse obtained when material 29 is adjacent source 31 and a data pulse obtained when vacant opening 28 is adjacent to the source.

The reference pulse is obtained when the source emits light in the predetermined wavelength band which light is converted by material 29 to visible light which then passes through the sensor cell 11 undiminished in intensity and is "read" by photoresistor 32. The data pulse is obtained when the source emits light in the given wavelength band which light passes through vacant window 28 when the chopper drum has rotated 180° and, in passing through cell 11, has its intensity diminished by absorption in the given wavelength band by the gas sample present in the cell. The diminished light intensity is then converted by material 29 to visible light at the reduced intensity which is "read" by the photoresistor.

The comparison between reference and data pulses determines the concentration of anesthetic vapor agent in the gas sample since it is only the vapor agent which is capable of light absorption in the given wavelength band.

Conventional Reed switches 36 are positioned adjacent opposed drum sides. The drum further comprises a permanent magnet 35 which is positioned on said drum so that when said drum permits light to pass to the photoresistor said magnet actuates one of said Reed switches.

Figure 2:
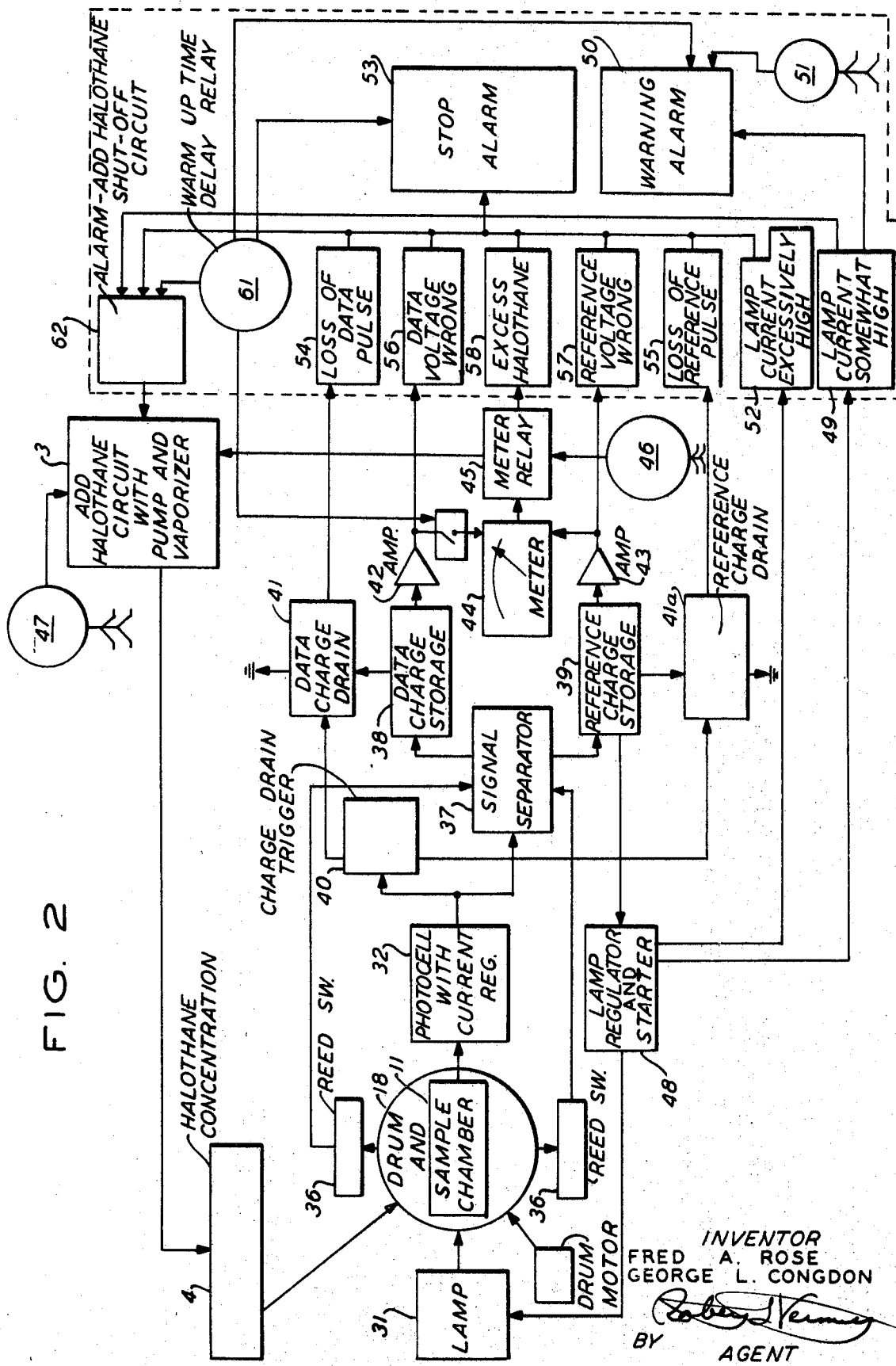
FIGURE 2 is a block diagram of the electrical circuit.

Referring now more specifically to FIGURE 2, Reed switches 36 lead to a signal separator 37 which separates the pulses for data charge storage 38 and reference charge storage 39. Photoresistor 32 has a lead into signal separator 37 and supplies it with the pulses for separation and later charge storage. Photoresistor 32 also has a lead to a Schmidt trigger 40 which initiates the action of the charge drain storage circuit which is responsive to drum rotation. The trigger actuates data charge drain 41 and reference charge drain 41a which drain the charge from the data charge storage 38 and reference charge storage 39, respectively, for receipt of new pulse charges.

The storage systems 38 and 39 each feed an amplifier, 42 and 43, respectively, through which a meter reading can be obtained at 44. The meter 44 leads into a meter relay 45 by which the anesthetic vapor agent concentration is controlled. The meter relay has a concentration control setting 46 operated by the anesthetist which setting actuates the vaporizer pump 5 and solenoid operated valves 6 and 9 simultaneously to permit vapor flow 3 and increase the vapor concentration if such should fall below the setting. An additional control 47 is provided to give the anesthetist the choice of monitoring or controlling anesthetic concentration. Vapor flow 3 provides increased halothane vapor concentration in the analysis flow 4 after circulation thus causing a new meter reading at 44 eventually bringing the reading up to the setting at 46.

It should be noted that in order to have a stable system, the ultraviolet light source 31 should be maintained at a constant intensity by means of regulating the lamp currect such that the reference pulse is of constant amplitude. Thus, a lamp starter for initial use and regulator 48 is provided so that if the intensity is decreasing, the regulator can permit additional current flow to maintain the lamp intensity.

In order to approach a "fail-safe" system, an elaborate alarm system is provided.

If the regulator 48 calls for a "somewhat" high lamp current 49 to maintain the lamp intensity, a warning alarm light and buzzer 50 are triggered which require manual shut-off 51 and permits continued use. If, however, the lamp current becomes "excessively high" as designated at 52, a stop alarm light and buzzer 53 are triggered and the machine function is halted until repaired.

If there occurs a loss of either the data charge drain pulse 54 or reference charge drain pulse 55, stop alarm 53 is triggered. Furthermore, if either data voltage 56 or reference voltage 57 are too low as fed from the amplifiers 42 and 43, respectively, the stop alarm 53 is triggered. In addition, when the meter reading at 44 exceeds the setting 46 by a predetermined amount, e.g., 1 percent, the meter relay 45 through an "excess" halothane circuit 58 triggers the stop alarm 53. Where a meter reading at 44 is not yet available during warm-up time, which is of constant amount, a delay relay 61 prevents the triggering of warning alarm 50, stop alarm 53, the meter switch at 44, and circuit 62. The circuit 62 shuts off the vapor flow circuit 3 under any of the above negative conditions.

Figure 3:
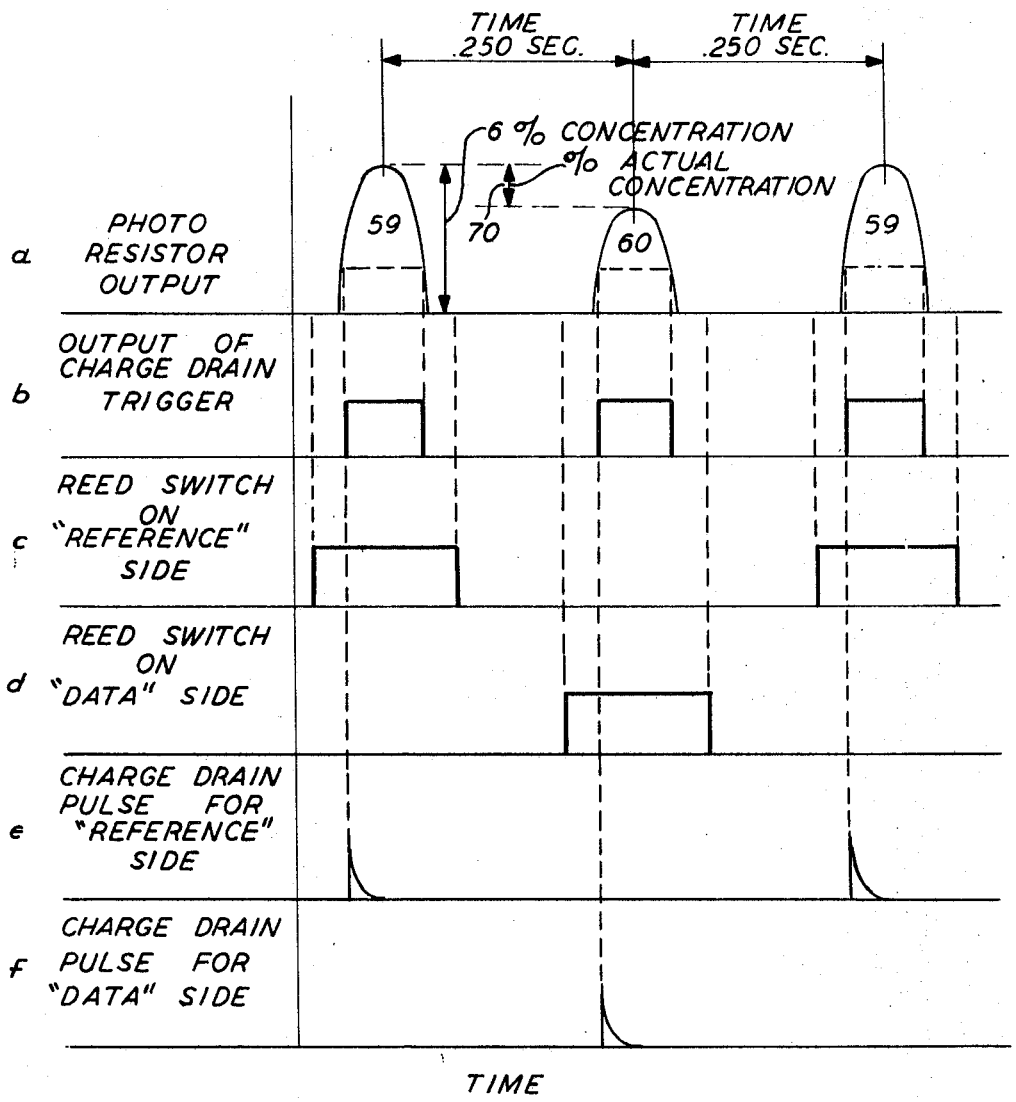
FIGURE 3 is a graphic representation of pulse-time comparisons.

Referring now to FIGURE 3, a graphic time representation of system variables is shown. In part a, the range of concentration approximates 6 percent halothane vapor. Thus, peak 59 is a reference peak upon which the range of concentration is calibrated. The reference peak is derived from the photoresistor pulse occurring when the window 29 is adjacent light source 31. At the next 180° rotation of drum 18, a data pulse 60 is sent by the photoresistor 32. This pulse signifies the diminished light intensity by absorption directly proportioned to the concentration of halothane vapor present in the gas sample. Thus, a final meter reading at 44 can be obtained based on the difference 70.

Part b shows the output of the charge drain trigger while parts e and f show, respectively, the reference and data charge drain, all in relation to the photoresistor output in part a. Parts c and d show, respectively, the actuation of the Reed switches on the reference and data sides in relation to the photoresistor output in part a.

The above description should be viewed as illustrative and not in a limiting sense. For example, the drum and sensor cell could be constructed such that the gas sample is introduced into the drum which acts as the cell and the chopper. Furthermore, the vaporizer and analysis flows could empty into the exhalation stream.

Having thus described our invention, what we claim as new and desire to secure by Letters Patent of the the United States is:

We claim:

1. Apparatus comprising a cylindrical drum rotatably mounted above a support and having an open end and two diametrically opposed apertures, one of said apertures containing a material having a conversion peak at a predetermined wavelength, a closed hollow cell disposed within said drum through said open end and supported by said support, said cell having opposed light-transparent windows and containing a sample comprising a plurality of constituents, a light source emitting light of said predetermined wavelength positioned on one side of said drum, a photocell positioned on the opposite side of said drum whereby light from said light source can travel through said drum and cell to said photocell at each 180° of drum rotation and means associated with said photocell and drum for reading the difference in light intensity at the photocell when each of the drum apertures is alternately adjacent the light source.

2. The apparatus set forth in Claim 1 wherein said means includes a magnet positioned on the drum and a pair of magnetic switches positioned adjacent opposite sides of said drum so that when light passes to said photocell, said magnet actuates one of said switches.

3. The apparatus set forth in Claim 2 wherein said means further includes a signal separator adapted to receive signals from said photocell in response to actuation of said switches.

4. The apparatus set forth in Claim 3 wherein said means further includes a capacitor storage system adapted to receiving alternating signals from said separator, and an amplification system adapted to receive an input from said storage system, said amplification system including a meter reading the concentration of one of said constituents in said sample, said one constituent affecting the intensity of said light at the photocell.

5. The apparatus set forth in Claim 1 further comprising means to withdraw said sample from a main inhalation gas stream for introduction into said cell, means for controlling opposed openings concentration of at least one of said plurality of constituents in the main inhalation gas stream, said controlling means being responsive to said reading means.

6. Apparatus comprising a rotatable drum, said drum having two opposed openings therein, one of said openings containing a material having a light conversion peak of a predetermined wavelength, a sample within said drum, said sample comprising a plurality of constituents, means for emitting a beam of light of said predetermined wavelength, said beam of light adapted to pass through said openings in said drum and said sample contained within said drum at each half turn of said drum, and means for reading the intensity of the beam of light when the light passes through said drum.

7. The apparatus set forth in Claim 6 further comprising means to withdraw said sample from a main inhalation gas stream for continuous introduction into said drum, means for controlling the concentration of at least one of said plurality of constituents in the main inhalation gas stream, said controlling means being responsive to said reading means.

8. Apparatus comprising rotatable means having two opposed openings therein, one of said openings containing a material having a light conversion peak at a predetermined wavelength, light source means for establishing a path of light of said predetermined wavelength, a sample cell containing a sample therein, said sample containing at least one constituent, said sample cell having a light entrance and exit in optical alignment with said path of light to permit light to pass through said cell, detector means of optical alignment with said path of light and cell entrance and exit, said rotatable means being adapted to alternately position said openings in optical alignment with said path of light from a first position wherein said opening containing the light conversion material is interposed in the path of light between said sample cell and said detector means and a second position wherein said opening containing the light conversion material is interposed in the path of light between said light source means and said sample cell, and means for reading the difference in light intensity at the detector during each of said first and second positions of said rotatable means.

9. The apparatus set forth in Claim 8 further comprising means to withdraw said sample from a main inhalation gas stream for introduction into said cell, means for controlling the concentration of at least one of said plurality of constituents in the main inhalation gas stream, said controlling means being responsive to said reading means.

10. The apparatus set forth in Claim 8, wherein said rotatable means is a drum.

11. The apparatus set forth in Claim 8 wherein said light conversion material is phosphor-quartz.

PO-1050
(5/69)

UNITED STATES PATENT OFFICE
CERTIFICATE OF CORRECTION

Patent No. 3,524,463      Dated August 18, 1970

Inventor(s) Fred A. Rose and George L. Congdon

It is certified that error appears in the above-identified patent and that said Letters Patent are hereby corrected as shown below:

Col. 1, line 60, "vaporizor" should read -- vaporizer --.

Col. 3, line 11, "currect" should read -- current --.

Col. 4, line 26, "opposed openings" should read -- the --;

line 53, "of" should read -- in --;

line 54, before "cell" should be inserted -- said --.

SIGNED AND
SEALED
NOV 10 1970

(SEAL)
Attest:

Edward M. Fletcher, Jr.
Attesting Officer

WILLIAM E. SCHUYLER, JR.
Commissioner of Patents